(12) United States Patent
Angelsmark et al.

(10) Patent No.: US 10,089,254 B2
(45) Date of Patent: Oct. 2, 2018

(54) METHODS AND APPARATUS FOR DYNAMICALLY SELECTING AN INSTRUCTION SET

(71) Applicant: Telefonaktiebolaget LM Ericsson (publ), Stockholm (SE)

(72) Inventors: Ola Angelsmark, Ystad (SE); Per Persson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/485,441

(22) Filed: Apr. 12, 2017

(65) Prior Publication Data

US 2017/0364457 A1 Dec. 21, 2017

Related U.S. Application Data

(60) Provisional application No. 62/352,378, filed on Jun. 20, 2016.

(51) Int. Cl.
*G06F 13/10* (2006.01)
*G06F 9/445* (2018.01)
*G06F 17/30* (2006.01)
*G06F 11/14* (2006.01)

(52) U.S. Cl.
CPC ........ *G06F 13/102* (2013.01); *G06F 9/44536* (2013.01); *G06F 11/1487* (2013.01); *G06F 17/3053* (2013.01)

(58) Field of Classification Search
CPC .......................... G06F 9/44536; G06F 13/102
See application file for complete search history.

(56) References Cited

U.S. PATENT DOCUMENTS

| 2006/0265397 A1 | 11/2006 | Bryan et al. | |
|---|---|---|---|
| 2007/0204134 A1* | 8/2007 | Webber | G06F 9/3017 |
| | | | 712/209 |
| 2009/0222399 A1 | 9/2009 | Gomez et al. | |

(Continued)

FOREIGN PATENT DOCUMENTS

| CN | 102857567 A | 1/2013 |
|---|---|---|
| WO | 2005121955 A1 | 12/2005 |

OTHER PUBLICATIONS

Ahmed et al. "An efficient algorithm for partially matched services in internet of services"; Personal and Ubiquitous Computing; Jun. 1, 2016; pp. 283-293; vol. 20, No. 3; XP058261992; Springer Verlag; London, Great Britain.

*Primary Examiner* — Glenn A. Auve
(74) *Attorney, Agent, or Firm* — Coats & Bennett, PLLC

(57) ABSTRACT

Methods and apparatus for dynamic instruction set selection for producing an output parameter based on one or more available input parameters are presented. In an example method, a device selects, from different candidate instruction sets that are each configured to produce a same output parameter, an instruction set that requires one or more input parameters that are each available at the device. In addition, in the example method, the device obtains the output parameter by executing the selected instruction set using the input parameters required by that instruction set. In some examples where more than one candidate instruction sets could be selected based on the available input parameters, the device may select the highest-ranking instruction set for execution.

30 Claims, 4 Drawing Sheets

(56) References Cited

U.S. PATENT DOCUMENTS

2013/0325357 A1   12/2013   Walerow et al.
2014/0298295 A1   10/2014   Overbeck
2014/0358442 A1   12/2014   Akhlaq et al.

* cited by examiner

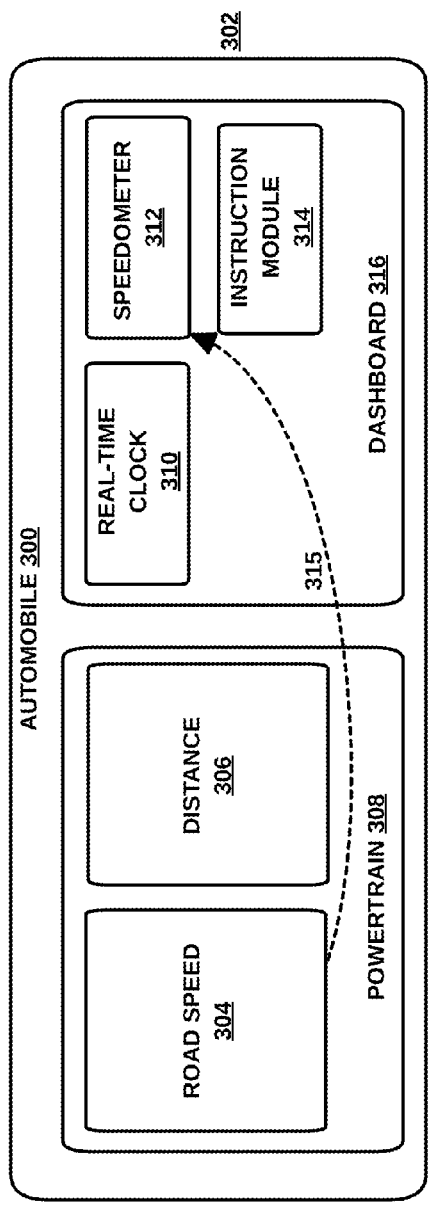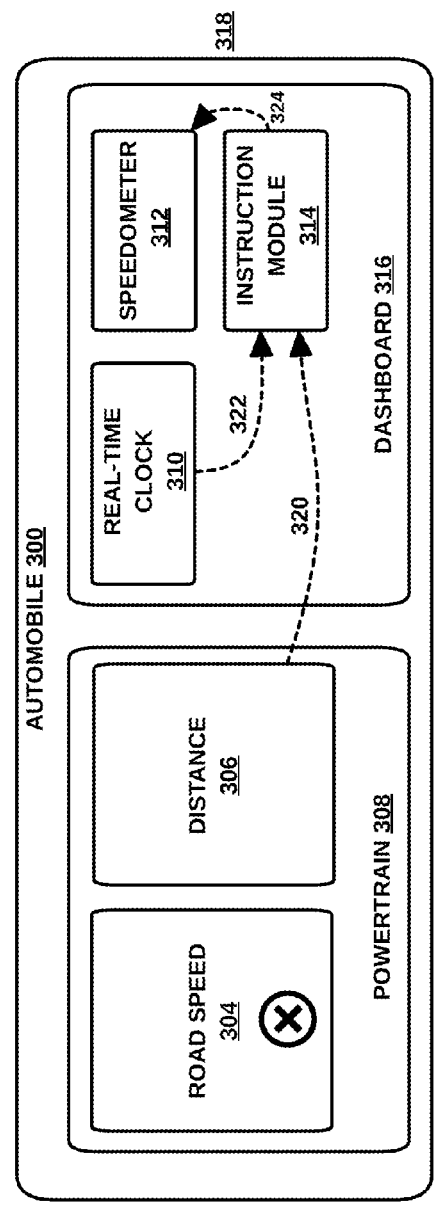
FIG. 3A
FIG. 3B

US 10,089,254 B2

METHODS AND APPARATUS FOR DYNAMICALLY SELECTING AN INSTRUCTION SET

RELATED APPLICATIONS

This application claims priority to U.S. Provisional Patent Application Ser. No. 62/352,378 filed Jun. 20, 2016, the entire contents of which are incorporated herein by reference.

TECHNICAL FIELD

The application relates to methods and apparatus for dynamically selecting an instruction set for producing an output parameter based on one or more available input parameters.

BACKGROUND

With increasing Internet-of-Things (IoT) device deployment, location- and object-specific information is becoming increasingly available. Existing devices that utilize such information to produce an output, however, are often hard-coded to require a specific, unmalleable set of input parameters from an equally limited set of specific sources of the input parameters. As such, when they are unable to receive the required input parameters from the appropriate sources, these devices cannot produce their required output.

Therefore, many existing devices remain inflexible regarding potential input source devices and/or parameters, reducing their potential implementation scenarios to a limited set of static environments in which all required inputs are obtained by the respective devices from a group of expressly defined input sources. As such, improvements in the art are needed to allow devices to obtain a given output based on an available set of input parameters that can change depending on time and location.

SUMMARY

One or more embodiments herein select an instruction set to be executed from multiple different available instruction sets, each of which produces the same output parameter. Each of the instruction sets, however, can rely on different input parameters to produce the output parameter. As such, based on the available input parameters at a given time (e.g., from one of more available sensors) a device can select an instruction set to execute to obtain the output parameter based on the input parameters that are available at a given time.

Some embodiments, for example, include a method for dynamic selection of an instruction set by a device. In some examples, the method may include selecting, from different candidate instruction sets that are each configured to produce a same output parameter, an instruction set that requires input parameters that are available at the device. In addition, the example method may include obtaining the output parameter by executing the selected instruction set using the input parameters required by that instruction set.

Furthermore, in some examples, more than one instruction may be available for use based on a group of available input parameters. In such a scenario, the device should select one of the available instruction sets to execute to obtain the output parameter. Thus, example methods described herein may include obtaining a ranking of the different candidate instruction sets. In addition, the example methods may include determining that multiple instruction sets of the different candidate instruction sets each require input parameters that are available at the device. After such a determination, the method may include selecting a highest ranking instruction set of the multiple instruction sets as the instruction set to be executed.

Further embodiments include corresponding apparatus, computer programs, and computer program products.

BRIEF DESCRIPTION OF THE DRAWINGS

FIGS. 3A and 3B include block diagrams illustrating example implementation scenarios according to one or more embodiments of the present disclosure.

DETAILED DESCRIPTION

The present disclosure presents techniques for a device to utilize a dynamic set of available input parameters to generate a given output parameter. Specifically, in some communication environments, a set of available input parameters may be characterized as being dynamic, or "changing over time", by virtue of the device moving in space over some time period relative to one or more other devices (e.g., sensors or any other type of input parameter device) that serve as sources for one or more of these input parameters. At a given time and location, a snapshot of the environment reveals a particular set of input parameters available to the device (e.g., from the one or more input parameter source devices) for generating the given output parameter. This "snapshot" can define a "domain" of the device at that location and point in time.

The embodiments disclosed herein allow the device to utilize domain-specific knowledge, such as which input parameters are available and whether those available input parameters are sufficient to generate the output parameter, to provide operational flexibility in communication environments where available input parameters may change as a function of time and location. Specifically, the techniques provided in the described embodiments make use of an instruction module made up of one or more functional units, such that: (1) instruction sets can be written and consumed without taking into consideration the actual hardware configuration of a particular device, (2) the instruction module can select and utilize one or more instruction sets to generate a given output parameter from different sets of possible available input parameters, and (3) automated selection of an instruction set is provided for allowing the instruction module to map possible input parameters to available sensors through defined domain-specific capabilities, instructions, and output requirements.

Figure 1:
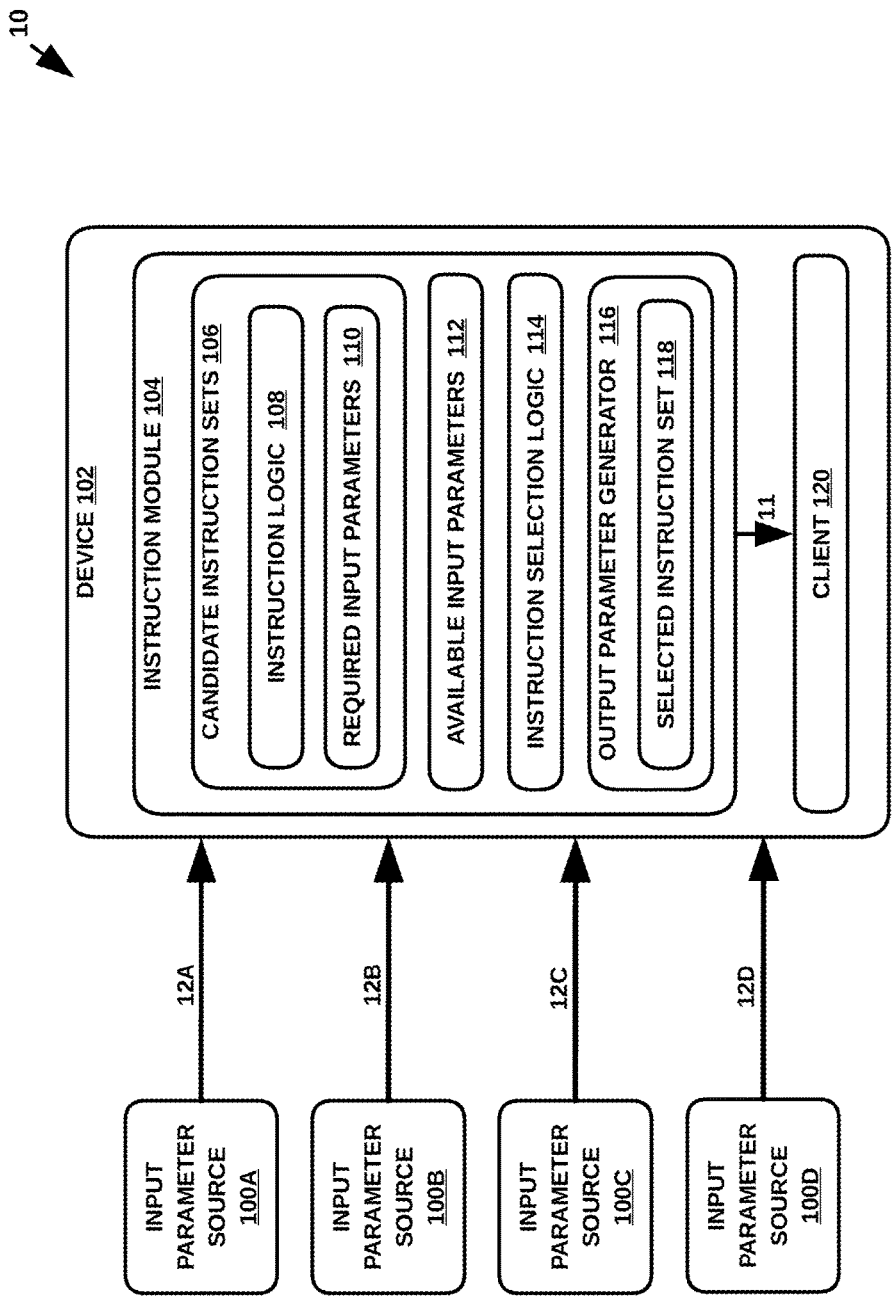
FIG. 1 illustrates a communication environment corresponding to example embodiments.

FIG. 1 illustrates a communication environment 10 that includes a device 102 configured to produce and send a particular output parameter 11 (e.g., to a client device or a module within the client device 120) based on multiple input parameters 12A-D that are output by one or more input parameter sources 100A-D, respectively. In some examples, the communication environment 10 may be implemented in an Internet-of-Things (IoT) context, wherein each of the input parameter sources 100A-D are IoT devices (e.g., sensors, clocks, location beacons, and the like) that continuously or periodically report (e.g. broadcast) parameter and/or state information 12 (including 12A, 12B, 12C, and/or 12D, together "12A-D") over a wireless communication channel. In some implementations, the input parameter sources (whether IoT-compliant devices or not), may be sensors that compute and report one or more parameters experienced at the sensor location, though this is by no means to be limiting. For instance, in an example implementation that may be utilized as reference throughout the present disclosure, the communication environment 10 may be associated with a vehicle, and in such an example implementation, the input parameter sources 100 (including 100A, 100B, 100C, and/or 100D, together "100A-D") may be a fuel level sensor, tire pressure sensor, speed sensor on the vehicle drivetrain, oil level sensor, blind spot sensor, an on/off state indicator for a rearview window wiper, or the like. An example of such an automobile implementation is provided in reference to FIGS. 3A and 3B, below.

Regardless of the implementation scenario, however, the device 102 can include an instruction module 104 that is configured to select an instruction set 118 from multiple candidate instruction sets 106 based on available input parameters 112 such that the selected instruction set 118, when executed, produces the output parameter 11. The output parameter 11 may be outputted from the instruction module 104 to a client 120, which as shown in FIG. 1 may reside in the device 102 (e.g., a separate client module external to the instruction module 104), and in some instances, may be a separate module or device (not shown) external to the device 102. The instruction module 104 may be any processing component or module configured to select and execute the instruction set 118 on available input parameters 112, such as, but not limited to, a processor, a memory storing processor-executable code for performing any of the aspects of the embodiments disclosed herein (see FIG. 3). In some non-limiting embodiments, the client 120 may include another device/module that requires the output parameter 11 as input.

The available input parameters 112 may be received from the one or more input parameter sources 100A-D mentioned above. In some instances, the available input parameters may include each of input parameters 12A-D, but in some cases, one or more of these input parameters 12A-D may be unavailable (e.g., due to a malfunction in a corresponding input parameter source 100A-D, the device 102 moving outside of a communication range of the particular input parameter source 100A-D, or any other scenario where an input parameter 12A-D is unavailable to the device 102). In such cases, although FIG. 1 illustrates input parameters 12A-D as being input to device 102, one or more of these input parameters may not be available, and as such, may not be input, and the available input parameters 112 would not include those parameters that are not in fact input/available at a given time.

The instruction module 104 may include candidate instruction sets 106, which may include, for each candidate instruction set of the candidate instruction sets 106, instruction logic 108, and one or more required input parameters 110. These required input parameters 110 are the input parameters for a given instruction set that are required for the instruction set to produce the output parameter 11. The instruction logic 108 includes a set of executable instructions that define the logic such that, when provided with the required input parameters 110, the executed instruction set will produce output parameter 11.

For instance, in one non-limiting example embodiment, the device 102 may execute instruction logic 108 for producing a vehicle speed as an output parameter 11. In doing so, the device 102 may compute the distance traveled over a particular time period. In this instance, the instruction logic 108 may include an instruction to select a first location parameter at a first time (e.g., a past location at a previous time stored in a memory of the device, for example) and a second location at a second time (e.g., a current location and time). The instruction logic 108 may include another instruction to compute a difference between the first location and the second location and between the first time and the second time. Furthermore, to determine the output parameter (vehicle speed), the instruction logic 108 may include a further instruction to compute a ratio of the difference between the locations to the difference between the times.

In addition, the instruction module may include instruction selection logic 114, which may include one or more instructions executable by the instruction module 104 to determine which of the candidate instruction sets 106 should be utilized to produce the output parameter 11. This instruction selection logic 114 may include instructions (i.e., defining said "logic") to determine the available input parameters 112 (e.g., query a memory or state module of the device 102) and compare the available input parameters 112 with the required input parameters 110 of the candidate instruction sets 106. The instruction selection logic 114 may include an instruction to select a candidate instruction set 106 whose required input parameters 110 are currently available input parameters 112.

If only one candidate instruction set 106 is able to be selected, then a further instruction of the instruction selection logic 114 may instruct the instruction module to select that instruction set. However, if two or more candidate instruction sets 106 are available for selection based on the above comparison, the instruction module may further execute instructions from instruction selection logic 114 that selects one of the multiple available candidate instruction sets 106 based on a ranking system. For instance, the candidate instruction sets 106 may be ranked (e.g., in a dynamic or static fashion) by the instruction module 104 according to a user- or manufacturer-defined list or according to an algorithm. The ranking algorithm may be included in the instruction selection logic 114 as one or more instructions, for instance, to periodically rank the candidate instruction sets 106 based on one or more parameters (e.g., channel conditions of link with a particular input parameter source 100, length of time since an input parameter 12 was unavailable, number of input parameters in the required input parameters 110, required time and/or resources required to compute the output parameter 11 for each candidate instruction set 106, etc.). Regardless of how the ranking is obtained, the instruction selection logic 114 may be configured to select an instruction set from the instruction sets whose required input parameters 110 are available input parameters 112 based on its relative position in the rankings (e.g. the highest-ranking available instruction set).

The instruction module 104, after selecting the instruction set 118, may utilize an output parameter generator (e.g., processing component in communication with memory) to execute the instruction set 118 using the most recent values of its required input parameters 110 to generate output parameter 11. When the output parameter is generated, it may be output by the instruction module 104 to a client 120, which may be a hardware component that displays the output parameter and/or executes instructions that require the output parameter 11 as input. For instance, in the case of the output parameter 11 being a vehicle speed, the client 120 may be a speedometer in a vehicle dashboard (displaying the output parameter 11) or may be a processor in the vehicle system that computes average vehicle speed over a trip duration (hardware component that takes the output 11 as a required input).

Figure 2:
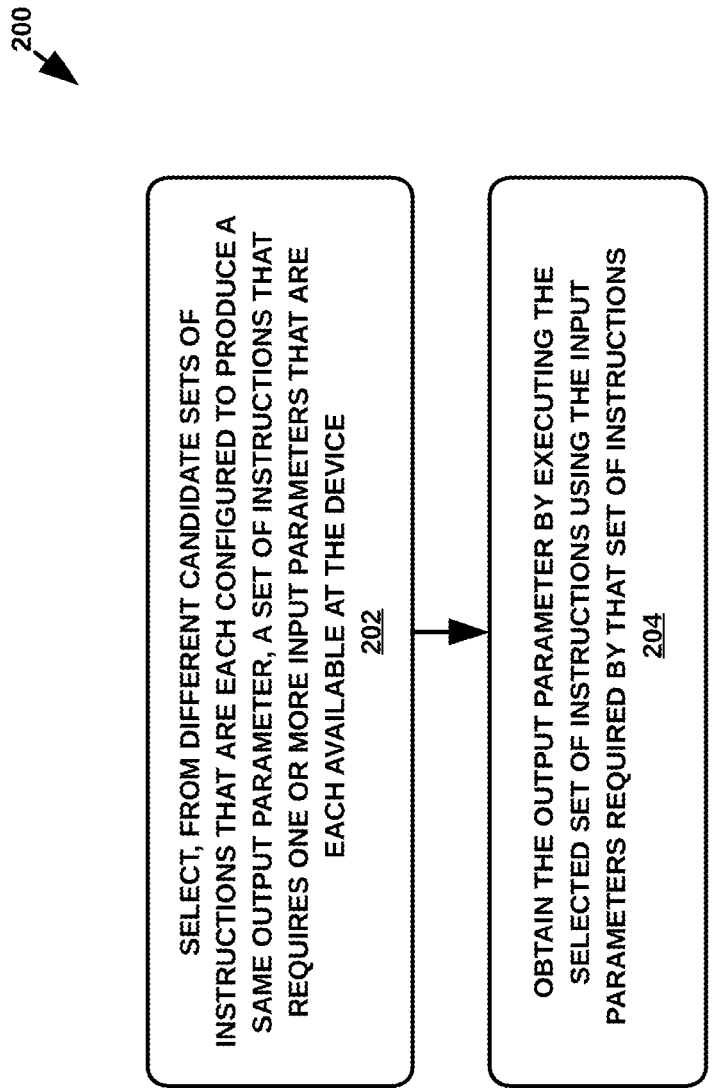
FIG. 2 illustrates a method performed by a device according to one or more embodiments.

FIG. 2 illustrates an exemplary method 200 performed by a device 102 for dynamic selection of an instruction set according to embodiments of the present disclosure. Such selection may be considered dynamic because the method 200 may be executed periodically and/or based on the occurrence of a triggering event, and as conditions change in a communication environment, different instruction sets may be selected over time. Thus, dynamic selection may mean, in some instances, that different instruction sets may be selected for different periods of time based on certain input parameter or environment conditions.

At block 202, method 200 may include selecting, from different candidate instruction sets that are each configured to produce a same output parameter, an instruction set that requires input parameters that are available at the device.

Furthermore, at block 204, method 200 may include obtaining the output parameter by executing the selected instruction set using the input parameters required by that instruction set. In some examples, blocks 202 and 204 may be performed by device 102 and/or an instruction module 104 associated with a device 102 (e.g., a processor executing instructions stored in memory on device 102).

In addition, although not explicitly shown in FIG. 2, method 200 may include one or more further aspects. For instance, method 200 may further include determining the input parameters that are available to the device, for instance, by periodically transmitting a reporting command beacon to prompt any nearby and available input parameter source devices to reply with one or more parameters that they each output. Based on the responses to the beacon, the device can maintain a collection of presently available input parameters, such as in a memory associated with the device.

Furthermore, method 200 may include identifying one or more of the different candidate instruction sets that require the one or more input parameters that are each available to the device. In some cases, this may include querying the collection of presently available input parameters to identify these one or more candidate instruction sets. Ultimately, selecting the instruction set at block 202 can include selecting the instruction set from the identified one or more different candidate instruction sets that require only those parameters that are available to the device at a given time and location.

In some examples, method 200 may include obtaining a ranking of the different candidate instruction sets, wherein the selection of the instruction set to be utilized to generate the output parameter is based on the obtained ranking. In some examples, method 200 may include determining that multiple instruction sets of the different candidate instruction sets each require input parameters that are available at the device. Likewise, the method may include determining that one or more of the different candidate instruction sets each require input parameters that are unavailable at the device, and accordingly, these candidate instruction sets may be unconsidered for selection. If, however, the required input parameters for a particular candidate instruction set are determined to be available, the candidate instruction set may be effectively in contention for potential selection (in some examples, subject to ranking).

In some embodiments, method 200 may further include obtaining the ranking by executing a ranking algorithm that ranks the candidate instruction sets based on one or more parameters. These one or more parameters can include, but are not limited to including, one or more of: channel conditions of a link with an input parameter source device, a length of time since an input parameter was available (or has been unavailable), a number of input parameters required by a candidate instruction set, and/or a required time and/or resources required to compute the output parameter a candidate instruction set. Once the one or more candidate instruction sets have been ranked, method 200 may include selecting a highest-ranking instruction set of the different candidate instruction sets as the instruction set to be executed to obtain the output parameter.

Likewise, as is necessary to perform its other example aspects described above, method 200 can further include identifying input parameters that are available to the device, such as from one or more input parameter source devices. Accordingly, in some examples, the one or more input parameter source devices in method 200 report at least one of the required input parameters to the device. As stated above, these input parameter source devices can be an IoT device, such as, but not limited to, a sensor measuring a parameter.

In addition, method 200 may include outputting the output parameter to a client device or client module, which may be internal or external to device 102.

FIGS. 3A and 3B illustrate example implementations of the presently described techniques in an automobile context in two separate scenarios (scenario A 302 and scenario B 318). Both of FIGS. 3A and 3B show an automobile 300, which includes a powertrain 308 as an input parameter source device. As shown in scenario A 302 of FIG. 3A, the powertrain 308 is configured (when operating properly) to provide a road speed 304 of the automobile 300 to a speedometer 312 located on a dashboard 316 of the automobile 300. As such, so long as the road speed 304 is available to the speedometer 312, the speedometer is able to display the road speed 304.

Scenario B 318 of FIG. 3B shows a possible implementation of the present techniques where the road speed 304 is unavailable to the speedometer 312. In such a scenario, an instruction module 314 may determine that another input parameter, distance 306, is available via a signal (i.e., wired or wireless communication) 320. Likewise, the instruction module 314 may determine that a further input parameter, time 322, is available via another signal (i.e., wired or wireless communication) 322. Once these determinations are made, the instruction module 314 may select an instruction set of different candidate instruction sets that takes distance and time (or change in time) as input, and outputs road speed as the output parameter 324. Once the instruction set has been executed by instruction module 314, it can output the road speed to speedometer 312 such that the road speed can be displayed by the speedometer 312 even though road speed 304 is not available directly from powertrain 308.

Figure 4:
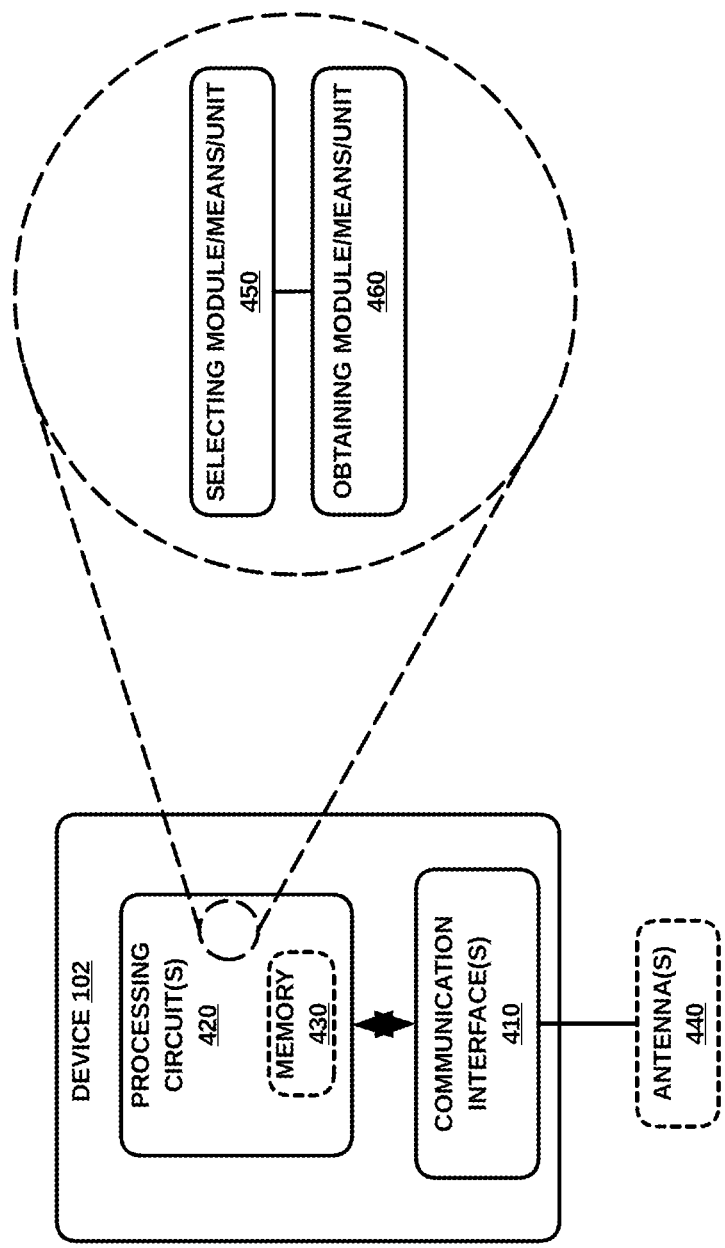
FIG. 4 illustrates details of an example device according to one or more embodiments.

FIG. 4 illustrates additional details of an example device 102 according to one or more embodiments. The device 102 is configured, e.g., via functional means or units, to implement processing to perform the aspects described above in reference to FIG. 2 and method 200. The device 102 in some embodiments for example includes a selecting module (or means or unit) 450 and/or an obtaining module (or means or unit) 460 for performing the aspects of method 200 presented in FIG. 2.

In at least some embodiments, the device 102 comprises one or more processing circuits 420 configured to implement processing of the method 200 of FIG. 2, such as by implementing functional means or units above. In one embodiment, for example, the processing circuit(s) 420 implements functional means or units as respective circuits. The circuits in this regard may comprise circuits dedicated to performing certain functional processing and/or one or more microprocessors in conjunction with memory 430. In embodiments that employ memory 430, which may comprise one or several types of memory such as read-only memory (ROM), random-access memory, cache memory, flash memory devices, optical storage devices, etc., the memory 430 stores program code that, when executed by the one or more for carrying out one or more microprocessors, carries out the techniques described herein. In some examples, the memory 430 may store instruction logic 108 and the required input parameters 110 of the candidate instruction sets 106, a group of available input parameters 112, current or past values of these available input parameters 112 (or input values not currently available but that were previously available), the instruction selection logic 114, client 120 identifiers or properties, the input parameter sources 100A-D, or any other information or logic required to perform the aspects of the presently disclosed techniques when executed by processing circuit(s) 420.

In one or more embodiments, the device 102 also comprises one or more communication interfaces 410. The one or more communication interfaces 410 include various components (e.g., antennas 440) for sending and receiving data and control signals. More particularly, the interface(s) 410 include a transmitter that is configured to use known signal processing techniques, typically according to one or more standards, and is configured to condition a signal for transmission (e.g., over the air via one or more antennas 440). Similarly, the interface(s) include a receiver that is configured to convert signals received (e.g., via the antenna(s) 440) into digital samples for processing by the one or more processing circuits. The transmitter and/or receiver may also include one or more antennas 440. By utilizing the communication interface(s) 410 and/or antenna(s) 440, the device 102 is able to communicate with the input parameter sources 100A-D and client device or client module 120 (e.g., where the client 120 can be located external to the device 102).

In addition, the communication interface(s) 410 and/or antenna(s) 440 may be configured to tune to frequency bands/channels/radio resources (e.g., time and/or frequency resources) over which one or more input parameter resources 100 (including, and in addition to, input parameter resources 100A-D) may transmit beacon, pilot, or other signals indicating their presence and any associated information. This associated information may include a source (i.e. device) identifier, a list of input parameters that the source reports, a type of device (e.g., sensor, clock, location beacon, etc.). When the device moves in space, the availability of sources and input parameters may also change based on the device traveling into or out of a communication range of said input parameter sources 100. As a result, the set of input parameter sources 100, the available input parameters 112, the current ranking of candidate instruction sets, or other factors may change due to device movement. Therefore, by tuning to resources over which the input parameter sources 100 are discoverable, the device 102 can maintain a nearly real-time list of input parameters 112 and candidate instruction sets 106 available to the device 102 to ensure that output parameter 11 is able to be delivered to client 120. Furthermore, because the device contains various sets of logical instructions that depend on different sets of available inputs, the device 102 can be agnostic to any particular domain (e.g., time-space location or particular communication environment) because it is able to adapt its executed instruction set based on the input parameters available in its current location or communication environment.

Those skilled in the art will also appreciate that embodiments herein further include corresponding computer programs. A computer program comprises instructions which, when executed on at least one processor of the device 102, cause the device 102 to carry out any of the respective processing described above. Embodiments further include a carrier containing such a computer program. This carrier may comprise one of an electronic signal, optical signal, radio signal, or computer readable storage medium. A computer program in this regard may comprise one or more code modules corresponding to the means or units described above.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method for instruction set selection by a device, comprising:
   selecting, from different candidate instruction sets that are each configured to produce a same output parameter, an instruction set that requires one or more input parameters that are each available to the device; and
   obtaining the output parameter by executing the selected instruction set using the input parameters required by that instruction set.

2. The method of claim 1, further comprising:
   determining the input parameters that are available to the device; and
   identifying one or more of the different candidate instruction sets that require the one or more input parameters that are each available to the device,
   wherein selecting the instruction set comprises selecting the instruction set from the identified one or more different candidate instruction sets.

3. The method of claim 1, wherein selecting the instruction set comprises:
   obtaining a ranking of the different candidate instruction sets;
   determining that multiple instruction sets of the different candidate instruction sets each require input parameters that are available at the device; and
   selecting a highest-ranking instruction set of the multiple instruction sets as the instruction set to be executed to obtain the output parameter.

4. The method of claim 3, wherein obtaining the ranking comprises executing a ranking algorithm, wherein the ranking algorithm ranks the candidate instruction sets based on one or more parameters.

5. The method of claim 4, wherein the one or more parameters comprise one or more of channel conditions of a link with an input parameter source device, a length of time since an input parameter was unavailable, a number of input parameters required by a candidate instruction set, and/or a required time and/or resources required to compute the output parameter using a particular candidate instruction set.

6. The method of claim 1, further comprising identifying input parameters that are available to the device.

7. The method of claim 6, further comprising obtaining the input parameters that are available to the device from one or more input parameter source devices.

8. The method of claim 7, wherein each of the one or more input parameter source devices reports at least one of the required input parameters to the device.

9. The method of claim 7, wherein at least one of the one or more input parameter source devices comprises an Internet-of-Things (IoT) device.

10. The method of claim 7, wherein at least one of the one or more input parameter sources comprises a sensor.

11. The method of claim 1, further comprising sending the output parameter to a client device or client module.

12. A device configured for instruction set selection, the device comprising:
one or more processing circuits and a memory, the memory containing executable instructions, that when executed by the one or more processing circuits, cause the device to:
select, from different candidate instruction sets that are each configured to produce a same output parameter, an instruction set that requires one or more input parameters that are each available to the device; and
obtain the output parameter by executing the selected instruction set using the input parameters required by that instruction set.

13. The device of claim 12, the memory further containing executable instructions, that when executed by the one or more processing circuits, cause the device to:
determine the input parameters that are available to the device; and
identify one or more of the different candidate instruction sets that require the one or more input parameters that are each available to the device,
wherein selecting the instruction set comprises selecting the instruction set from the identified one or more different candidate instruction sets.

14. The device of claim 12, wherein the instructions to select the instruction set further comprise instructions, that when executed by the one or more processing circuits, cause the device to:
obtain a ranking of the different candidate instruction sets;
determine that multiple instruction sets of the different candidate instruction sets each require input parameters that are available at the device; and
select a highest-ranking instruction set of the multiple instruction sets as the instruction set to be executed to obtain the output parameter.

15. The device of claim 14, wherein the instructions to obtain the ranking comprise instructions to execute a ranking algorithm, wherein the ranking algorithm ranks the candidate instruction sets based on one or more parameters.

16. The device of claim 15, wherein the one or more parameters comprise one or more of channel conditions of a link with an input parameter source device, a length of time since an input parameter was unavailable, a number of input parameters required by a candidate instruction set, and/or a required time and/or resources required to compute the output parameter using a particular candidate instruction set.

17. The device of claim 12, wherein the instructions further comprise identifying input parameters that are available to the device.

18. The device of claim 17, wherein the instructions further comprise instructions to obtain the input parameters that are available to the device from one or more input parameter source devices.

19. The device of claim 18, wherein each of the one or more input parameter source devices reports at least one of the required input parameters to the device.

20. The device of claim 18, wherein at least one of the one or more input parameter source devices comprises an Internet-of-Things (IoT) device.

21. The device of claim 18, wherein at least one of the one or more input parameter sources comprises a sensor.

22. The device of claim 12, wherein the instructions further comprise instructions to send the output parameter to a client device or client module.

23. A computer program product stored on a non-transitory computer readable medium and comprising computer readable code, which when executed by a device, causes the device to:
select, from different candidate instruction sets that are each configured to produce a same output parameter, an instruction set that requires one or more input parameters that are each available to the device; and
obtain the output parameter by executing the selected instruction set using the input parameters required by that instruction set.

24. The computer program product of claim 23, the memory further containing executable instructions, that when executed by the device, cause the device to:
determine the input parameters that are available to the device; and
identify one or more of the different candidate instruction sets that require the one or more input parameters that are each available to the device,
wherein selecting the instruction set comprises selecting the instruction set from the identified one or more different candidate instruction sets.

25. The computer program product of claim 23, wherein the instructions to select the instruction set further comprise instructions, that when executed by the one or more processing circuits, cause the device to:
obtain a ranking of the different candidate instruction sets;
determine that multiple instruction sets of the different candidate instruction sets each require input parameters that are available at the device; and
select a highest-ranking instruction set of the multiple instruction sets as the instruction set to be executed to obtain the output parameter.

26. The computer program product of claim 25, wherein the instructions to obtain the ranking comprise instructions to execute a ranking algorithm, wherein the ranking algorithm ranks the candidate instruction sets based on one or more parameters.

27. The computer program product of claim 26, wherein the one or more parameters comprise one or more of channel conditions of a link with an input parameter source device, a length of time since an input parameter was unavailable, a number of input parameters required by a candidate instruction set, and/or a required time and/or resources required to compute the output parameter using a particular candidate instruction set.

28. The computer program product of claim 23, wherein the instructions further comprise identifying input parameters that are available to the device.

29. The device of claim 28, wherein the instructions further comprise instructions to obtain the input parameters that are available to the device from one or more Internet-of-Things (IoT) devices.

30. The computer program product of claim 23, wherein the instructions further comprise instructions to send the output parameter to a client device or client module.

* * * * *